(12) United States Patent
Pavesio et al.

(10) Patent No.: US 10,895,298 B2
(45) Date of Patent: Jan. 19, 2021

(54) SUSPENSION DEVICE OF A MOTOR-VEHICLE WHEEL

(71) Applicant: C.R.F. Società Consortile per Azioni, Orbassano (IT)

(72) Inventors: Carlo Pavesio, Turin (IT); Renato Badino, Turin (IT); Stefano Luca, Turin (IT); Silvano Sandri, Orbassano (IT); Dario Scantamburlo, Orbassano (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 197 days.

(21) Appl. No.: 16/153,888

(22) Filed: Oct. 8, 2018

(65) Prior Publication Data
US 2019/0107162 A1 Apr. 11, 2019

(30) Foreign Application Priority Data
Oct. 10, 2017 (EP) ..................................... 17195617

(51) Int. Cl.
*F16D 65/847* (2006.01)
*F16D 55/22* (2006.01)
(Continued)

(52) U.S. Cl.
CPC ............. *F16D 65/847* (2013.01); *B60G 3/06* (2013.01); *B60G 3/145* (2013.01); *B60T 5/00* (2013.01);
(Continued)

(58) Field of Classification Search
CPC .... F16D 65/847; F16D 55/22; F16D 2250/00; F16D 2055/0037; B60G 3/06;
(Continued)

(56) References Cited

U.S. PATENT DOCUMENTS 4,484,667 A * 11/1984 Bottieri, Jr. ............. B60C 23/18
188/218 A
4,620,616 A * 11/1986 Martin .................... B60B 19/10
188/218 A
(Continued)

FOREIGN PATENT DOCUMENTS

| DE | 4344051 A1 | 7/1994 |
| DE | 102005014153 A1 | 10/2006 |
| EP | 2833016 A1 | 2/2015 |

OTHER PUBLICATIONS

Nugue, Audrey, "Poly-Shape, Leader De La Fabrication Additive, Partenaire De La Victoire De Romain Dumas Au Pikes Peak 2017", Communique de presse, p. 1-2 (Jun. 2017), Retrieved from Internet: URL http:www.poly-shape.com/parutions/jurin/Romain_Dumas.pdf [retrieved on Apr. 5, 2018].
(Continued)

*Primary Examiner* — Darlene P Condra
(74) *Attorney, Agent, or Firm* — RMCK Law Group, PLC (57) ABSTRACT

A suspension device of a motor-vehicle wheel includes a support member of the wheel connected to a structure of the motor-vehicle by one or more suspension members and a brake disc connected in rotation with the motor-vehicle wheel. The device also includes a brake disc cover rigidly connected to the support member and at least partially surrounding the brake disc. The brake disc cover is formed in a single piece with said support member of the motor-vehicle wheel.

17 Claims, 8 Drawing Sheets

(51) Int. Cl.
*B60G 3/06* (2006.01)
*B60G 3/14* (2006.01)
*B60T 5/00* (2006.01)
*B62D 7/18* (2006.01)
*F16D 55/00* (2006.01)

(52) U.S. Cl.
CPC ............... *B62D 7/18* (2013.01); *F16D 55/22* (2013.01); *B60G 2206/50* (2013.01); *F16D 2055/0037* (2013.01); *F16D 2250/00* (2013.01)

(58) Field of Classification Search
CPC ...... B60G 3/145; B60G 2206/50; B60G 3/02; B60G 15/02; B60G 2204/149; B60G 2204/129; B60T 5/00; B62D 7/18

See application file for complete search history.

(56) References Cited

U.S. PATENT DOCUMENTS

| | | | | |
|---|---|---|---|---|
| 6,047,796 | A * | 4/2000 | Fitzgerald | B60B 7/00 188/218 A |
| 6,371,569 | B1 * | 4/2002 | Dean | B60B 7/061 188/218 A |
| 2008/0053762 | A1 * | 3/2008 | Nakamura | F16D 55/00 188/218 A |
| 2009/0308702 | A1 * | 12/2009 | Ichinose | F16D 65/0025 188/218 A |
| 2016/0084328 | A1 * | 3/2016 | Elliot | F16D 65/847 188/218 A |
| 2017/0259760 | A1 * | 9/2017 | Tanaka | B62D 7/18 |
| 2018/0326833 | A1 * | 11/2018 | Kurita | B60K 7/00 |

OTHER PUBLICATIONS

European Search Report for EP 17 19 5617 dated Apr. 6, 2018. 5 pages.

* cited by examiner

SUSPENSION DEVICE OF A MOTOR-VEHICLE WHEEL

CROSS-REFERENCE TO RELATED APPLICATION

This application claims priority to European Patent Application No. 17 195 617.0 filed Oct. 10, 2017. The disclosure of the above application is incorporated herein by reference in its entirety.

FIELD OF THE INVENTION

The present invention relates to a suspension device of a motor-vehicle wheel of the type including:
a wheel support member, connected to the motor-vehicle structure by means of one or more suspension members,
a brake disc connected in rotation with the wheel, and
a brake disc cover rigidly connected to the wheel support and surrounding, at least partially, said brake disc.

PRIOR ART

Braking systems of the disc brake type constitute the main solution on which, for years now, all manufacturers of means of transport are oriented, whether they are cars, motorcycles or trucks.

The use of auxiliary systems has been known for a long time to improve the functionality of a disc brake braking system, such as a brake disk cover. Typically, the brake disc cover is rigidly connected, for example, by means of fixing screws, to a wheel knuckle of the motor-vehicle suspension, and its main function is to protect the disc from foreign bodies, such as stones or the like, and dust and dirt in general, especially when driving on particularly uneven roads and/or with no paving.

OBJECT OF THE INVENTION

The object of the present invention is to propose a suspension device of a motor-vehicle wheel with the characteristics indicated above, which has a simple, lightweight construction that is economical to produce and which implements multiple functions in an efficient manner.

SUMMARY OF THE INVENTION

In view of achieving the aforesaid objects, the present invention relates to a device having the characteristics indicated at the beginning of this description and further characterized in that the brake disc cover is formed in a single piece with said support member of said motor-vehicle wheel.

The invention is applicable to both front drive wheel suspensions and rear non-drive wheel suspensions.

According to an important characteristic of the invention, the device according to the invention is formed by means of an additive manufacturing technology.

In a first embodiment of the invention, the device is characterized in that the support member of the wheel with which the cover is formed in a single piece is a wheel knuckle that rotatably supports a wheel pin. This embodiment can be associated with a motor-vehicle drive wheel.

In a second embodiment of the invention, the device is characterized in that said support member of the wheel with which the cover is formed in a single piece is an element rigidly carrying a wheel pin.

All of the above objects are achieved with a device having these and other characteristics recalled in the following claims.

DETAILED DESCRIPTION OF PREFERRED EMBODIMENTS OF THE INVENTION

Further characteristics and advantages of the invention will become apparent from the description that follows with reference to the attached drawings, provided purely by way of non-limiting example, wherein.

In the following description, various specific details are illustrated aimed at a thorough understanding of the embodiments. The embodiments can be implemented without one or more of the specific details, or with other methods, components, materials, etc. In other cases, known structures, constructive details, materials or operations are not illustrated or described in detail, since they can be produced in any known way, and also because they do not fall within the scope of the present invention.

The present invention is directed at a suspension device A, A' of a motor-vehicle wheel including a support member M, 16 of the wheel R, R', connected to the motor-vehicle structure by means of one or more suspension members B, 19, 25. Reference M indicates a knuckle M of a wheel R (FIG. 1), reference 16 indicates an element bearing a wheel pin P' (FIG. 7), reference B indicates an oscillating front suspension arm (FIG. 1), reference 19 indicates a front shock absorber (FIG. 1) and reference 25 indicates an oscillating rear suspension arm (FIG. 6).

Figure 1:
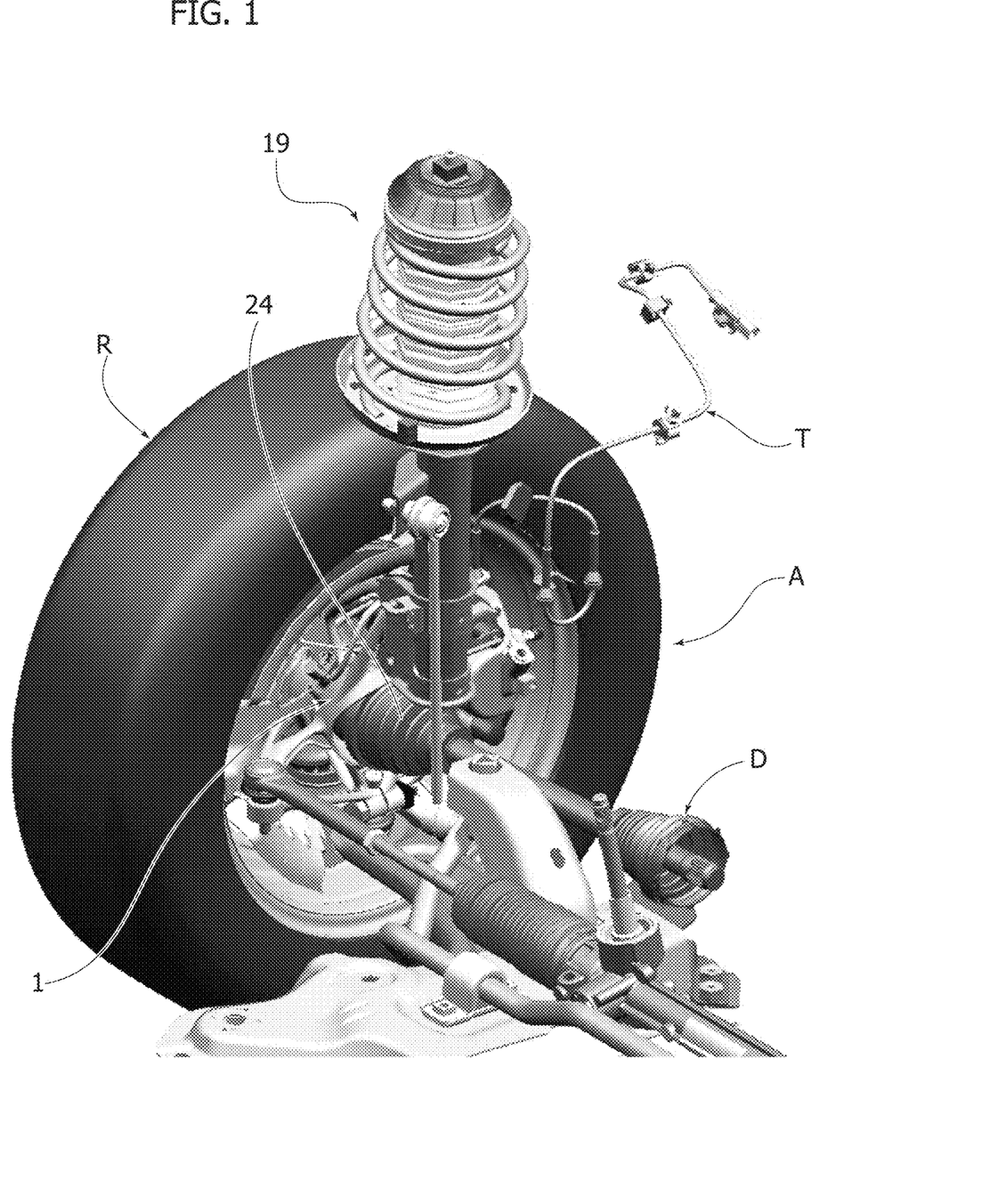
FIG. 1 is a perspective view of a first embodiment of a device according to the present invention associated with a motor-vehicle front drive wheel.
Figure 6:
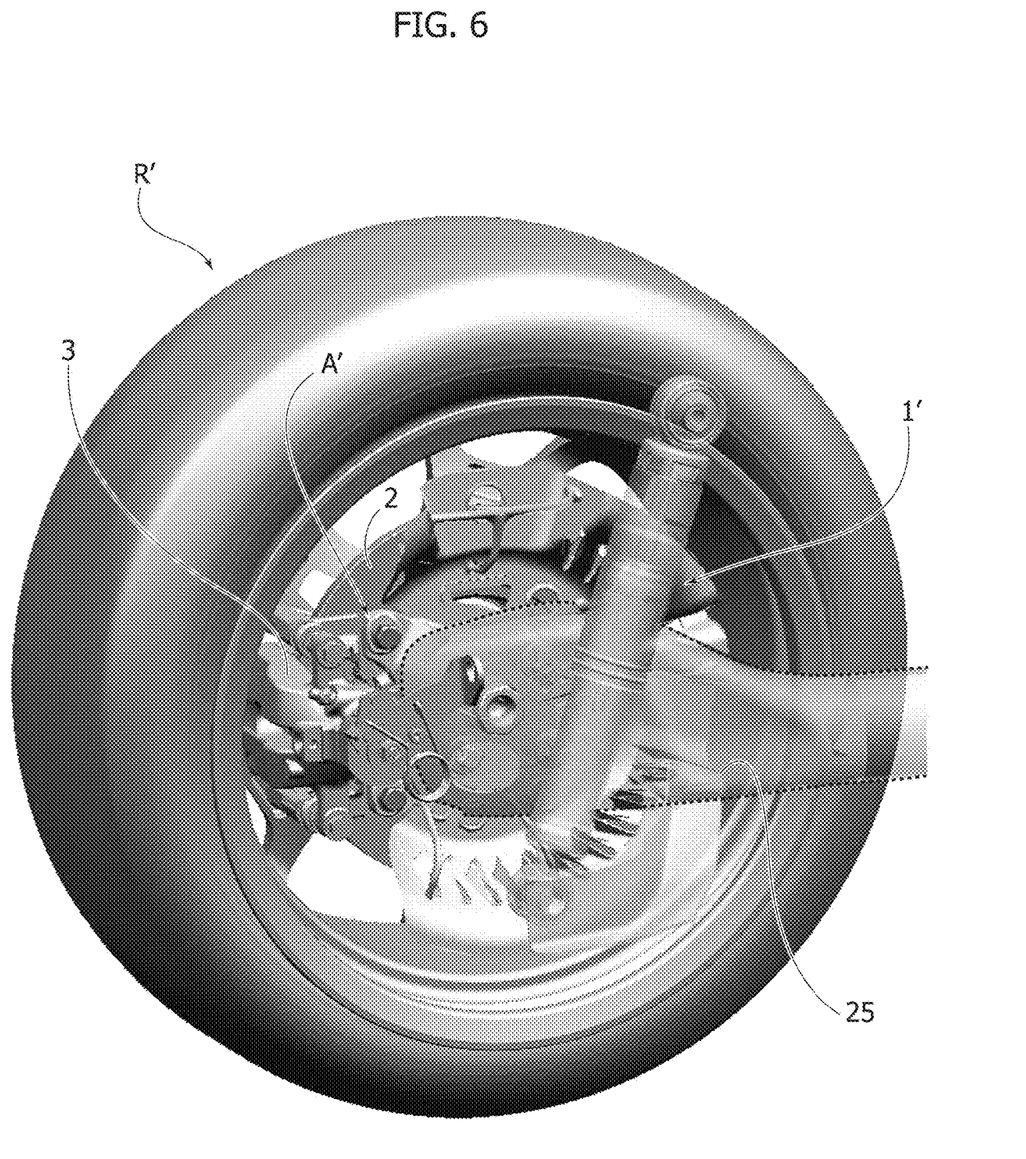
FIG. 6 is a perspective view of a second embodiment of the device according to the present invention associated with a motor-vehicle rear non-drive wheel.

According to the prior art, this device A, A' also includes a brake disc 2 connected in rotation with the wheel R, R' and a brake disk cover 1, 1' rigidly connected to the support member M, 16 and, at least partially, surrounding the brake disc 2 (FIGS. 1 and 6).

With reference to FIGS. 1-5, reference A indicates a first embodiment of the invention in which the cover 1 can be associated with a brake disc 2 of a front drive wheel of a motor-vehicle R.

Figure 7:
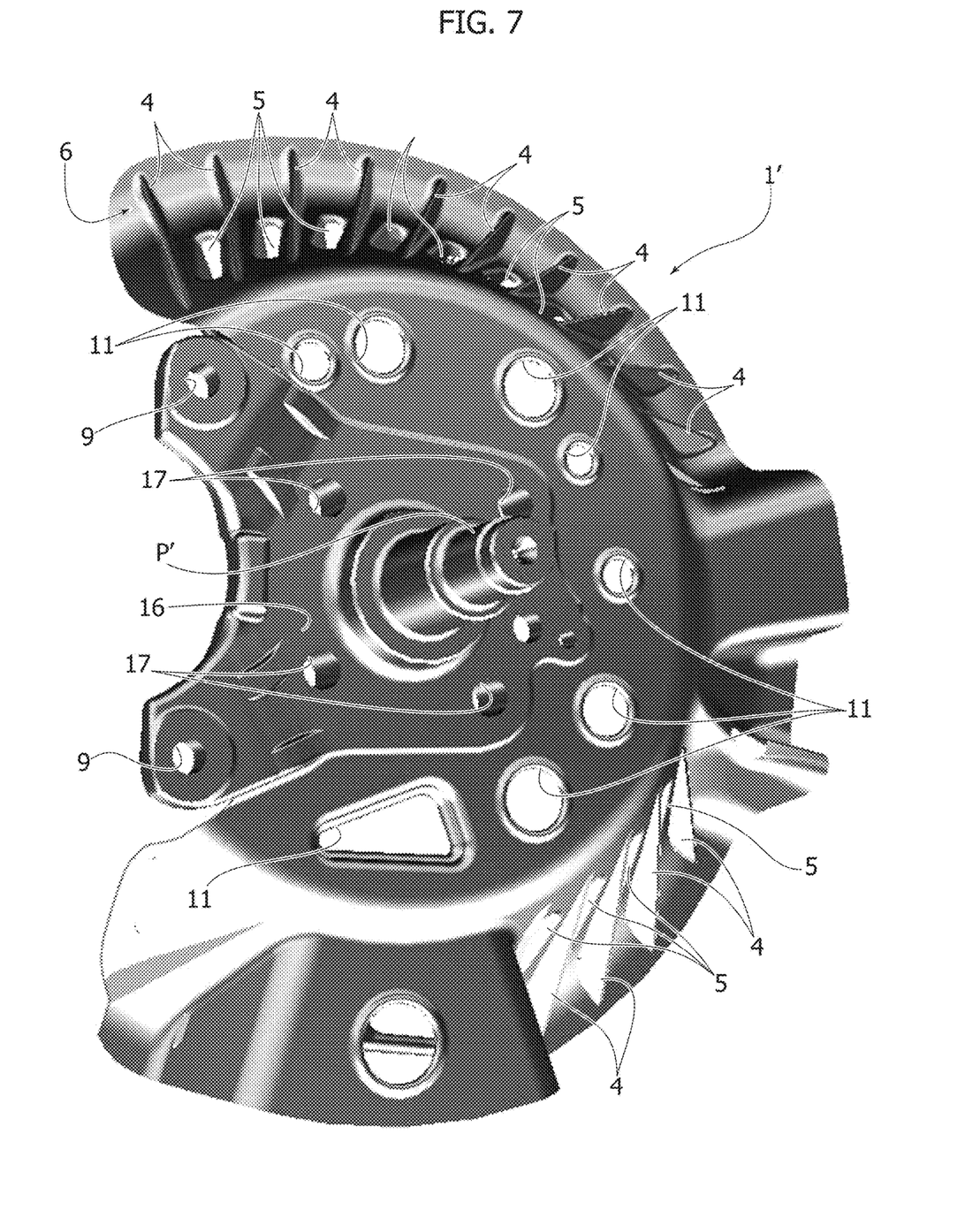
FIGS. 7 and 8 illustrate views on an enlarged scale of the device illustrated in FIG. 6.
Figure 8:
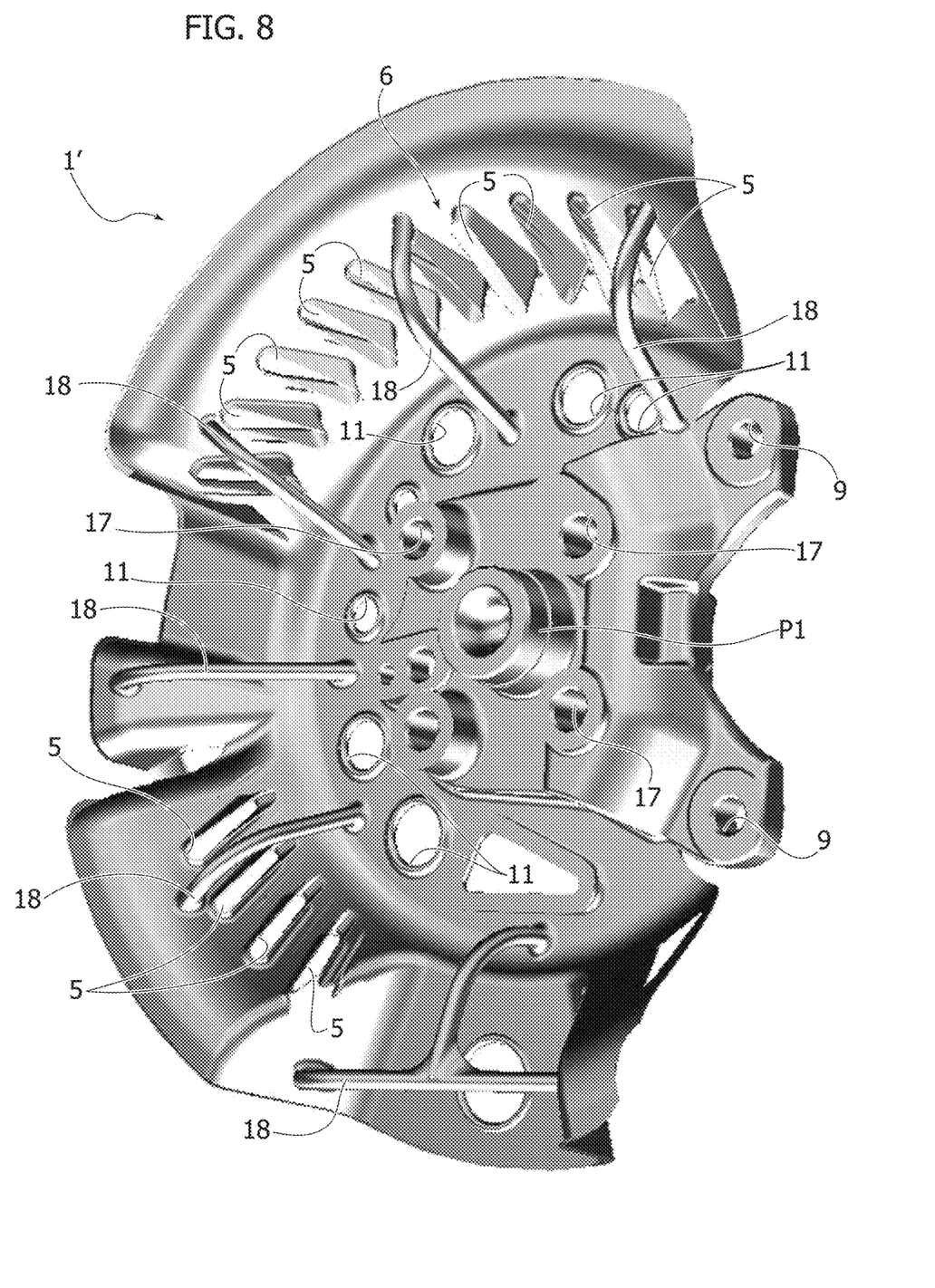

With reference to FIGS. 6-8, reference A' indicates a second embodiment of the invention in which the cover 1' can be associated with a brake disc 2 of a rear non-drive wheel R' of a motor-vehicle.

According to an essential characteristic of the present invention, common to both embodiments cited above, the cover 1, 1' of the brake disc 2 is formed in a single piece with the aforesaid support member M, 16 of the wheel R, R' of the motor-vehicle.

In the following description, the device A according to the invention will now be described in detail, wherein the brake disc cover 1 can be associated with a brake disc 2 of a motor-vehicle front drive wheel R.

According to a technique known per se, a wheel pin P is connected in rotation with an axle shaft D. The assembly constituted by the wheel pin P and the central body of the hub of the wheel R is rotatably supported by a wheel knuckle M. The knuckle M has a lower attachment point connected to the oscillating arm B and an upper attachment point connected to a shock absorber 19. The knuckle M is rotatable about an axis defined by a first joint 21 located at the point of attachment between the knuckle M and the lower oscillating arm B and a second joint (not shown in the drawings) located at the point of attachment between the knuckle M and the shock absorber A.

As previously mentioned, the cover 1 according to the invention is formed in a single piece with a supporting member of the wheel R of the motor-vehicle.

In the embodiment illustrated in FIGS. 1-5, this supporting member is formed by the knuckle M of the motor-vehicle wheel R.

According to an important characteristic of the invention, the cover 1 is formed in a single piece with the knuckle M by means of the additive manufacturing productive technology. This production technique is particularly suitable for making components with a particularly complex conformation in a single molding process, these components being traditionally implementable in different individual components, and subsequently assembled.

Figure 2:
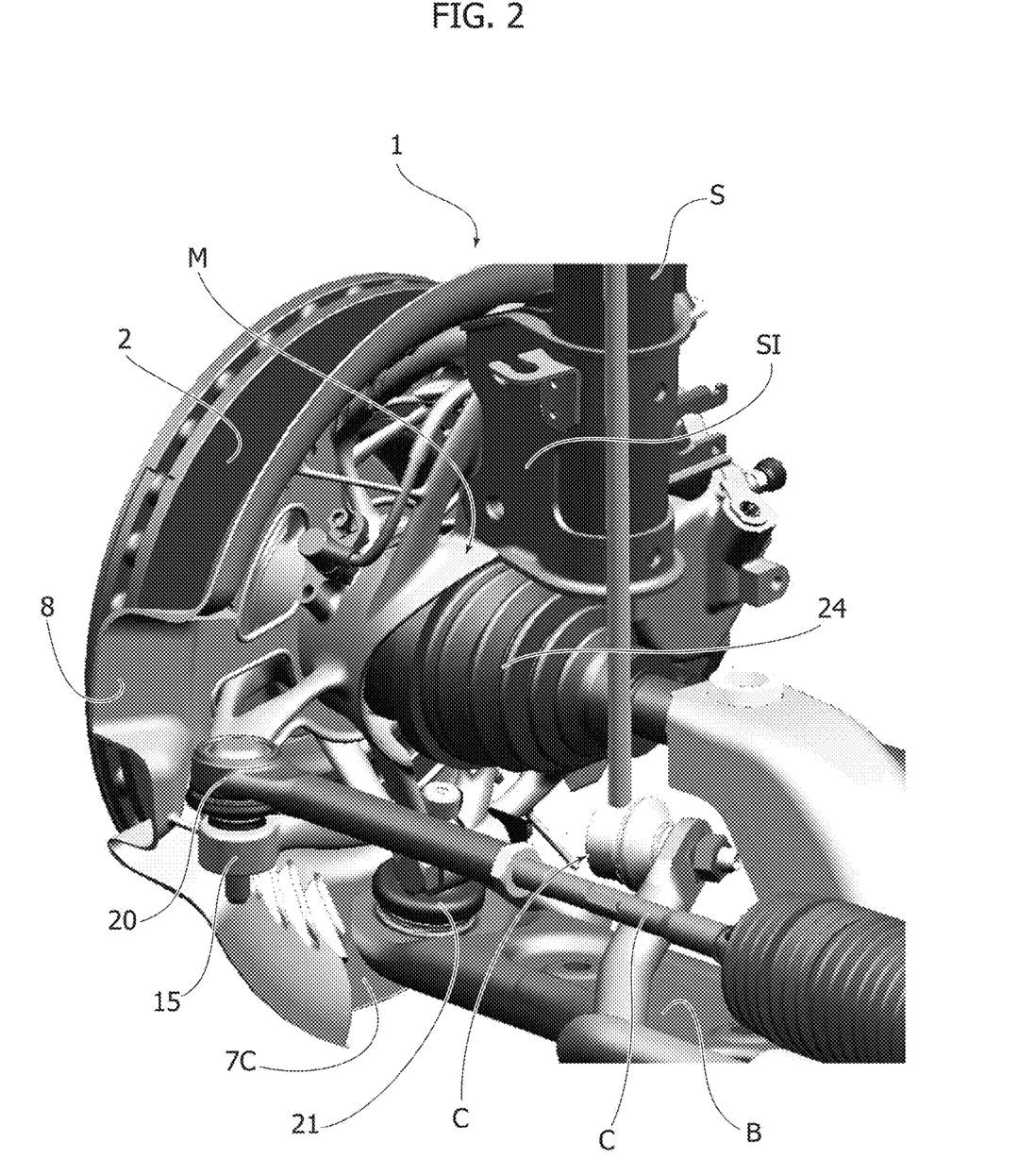
FIG. 2 is a view on an enlarged scale of FIG. 1, in which the motor-vehicle wheel has been removed.
Figure 5:
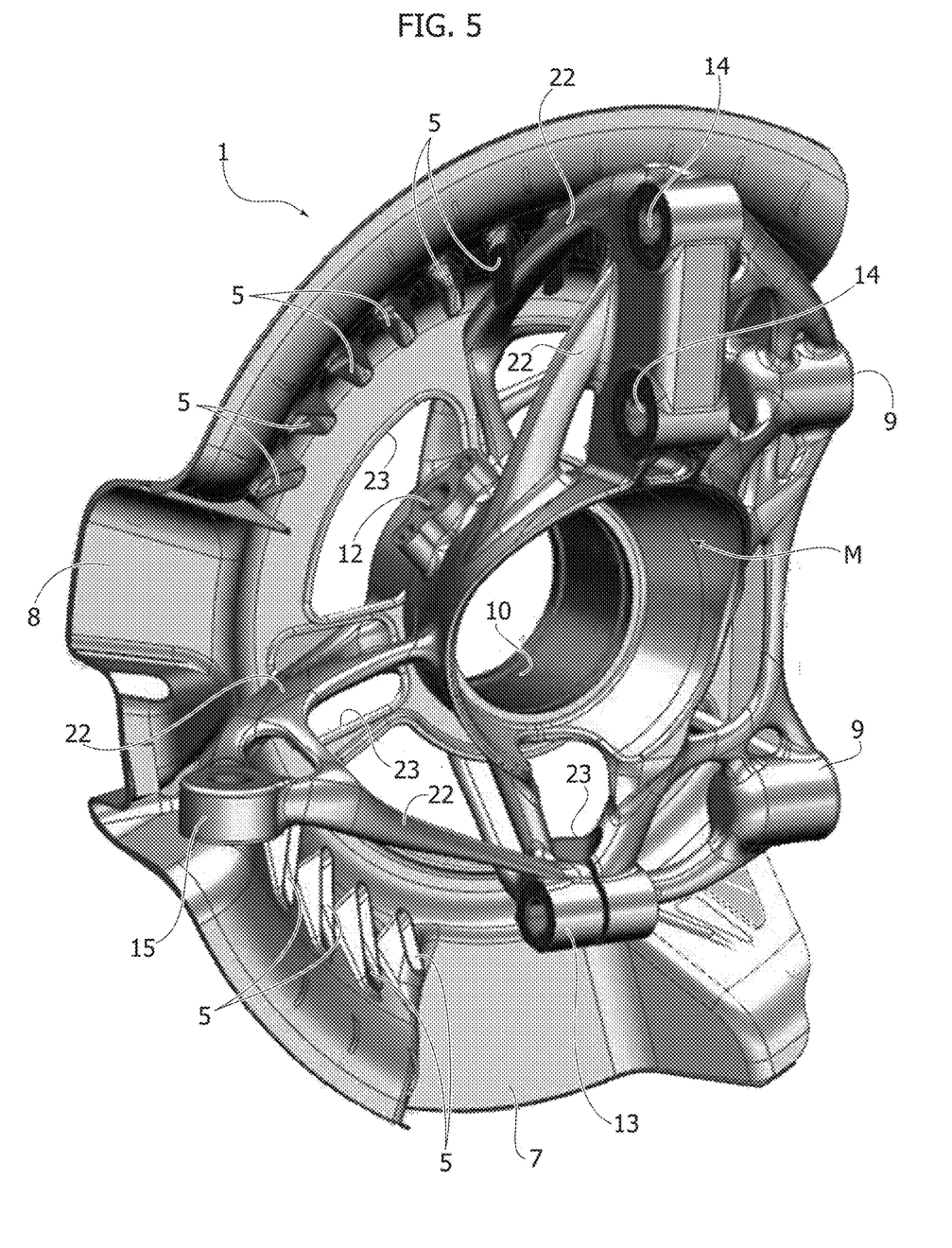

The cover 1 formed in a single piece with the knuckle M has a structure comprising a plurality of structural reinforcement arms 22, a plurality of lightening openings 23 and a perforated central portion 10 arranged to receive therein one end 24 of the axle shaft D of the motor-vehicle (FIGS. 2 and 5).

Figure 3:
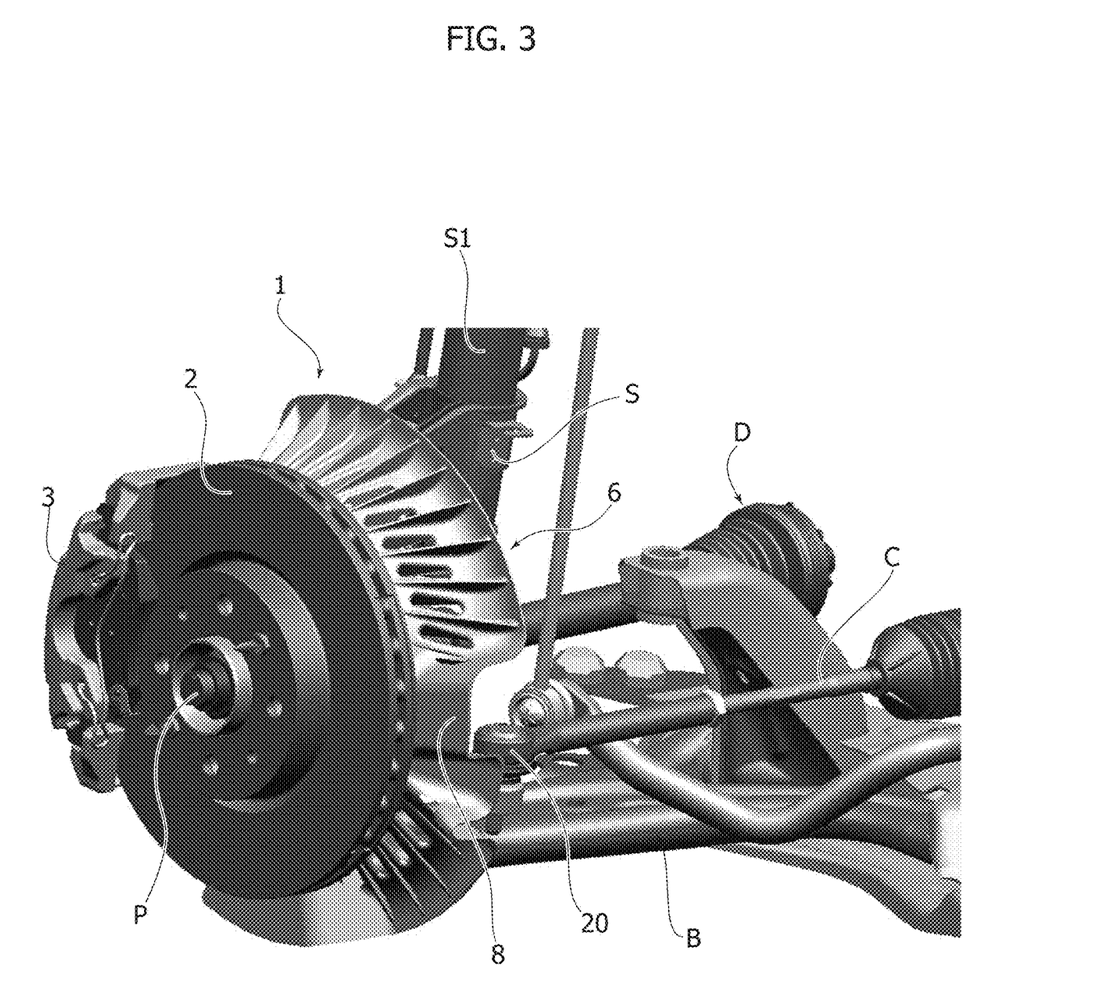
FIG. 3 is an additional perspective view of the details illustrated in FIG. 2, FIGS. 4 and 5 illustrate views on an enlarged scale of the device illustrated in the previous Figures.
Figure 4:
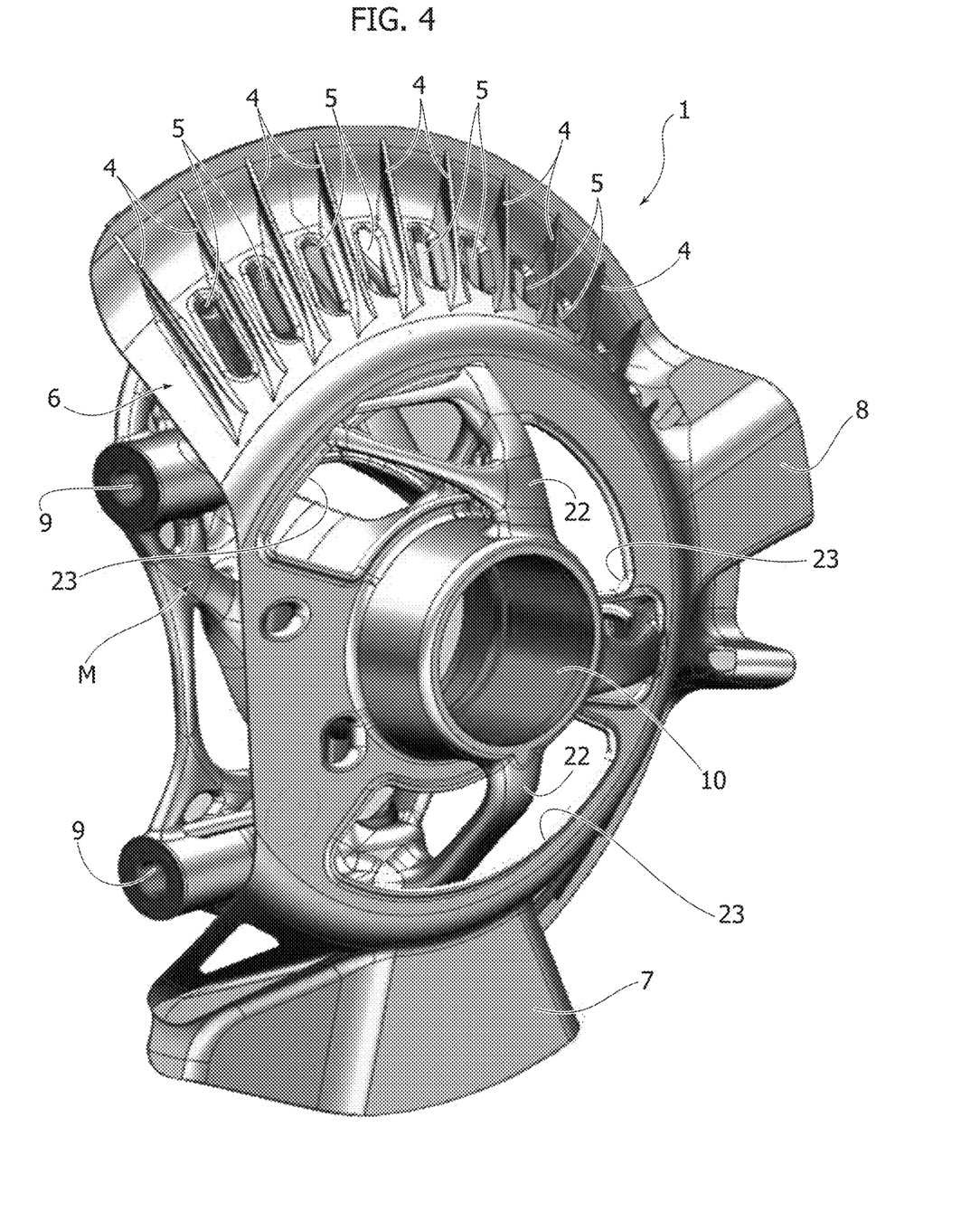

According to an important characteristic of the invention, the cover 1 has a plurality of fins 4 and openings 5 arranged radially along one of its peripheral portions 6 (FIGS. 3 and 4). The openings 5 are arranged to dissipate the heat generated by the brake disc 2 associated with the cover 1 and the fins 4 are configured so as to efficiently convey a cooling airflow within the openings 5. The fins 4 and the openings 5 are arranged alternately along the peripheral portion 6 of the cover 1. Thanks to the arrangement of the fins 4 and the openings 5, the device according to the invention also performs a thermal function, that is to cool the brake disc (in addition to protecting from blows from stones or dirt deriving from the motor-vehicle movement on the particularly uneven roads and/or without paving).

Of course, the fins 4 and the openings 5 can be oriented and conformed differently to that illustrated, so as to effectively cool the heat generated by the brake caliper and by the brake disc depending on how they are made.

With reference, in particular, to the perspective view of FIGS. 4 and 5, the cover 1 comprises a pair of attachment points 9 designed for connection to the brake caliper 3.

Furthermore, the cover 1 has a pair of protruding peripheral portions 7, 8 to cover additional suspension members of the motor-vehicle. In particular, a first protruding portion 7 is arranged to protect the spherical joint 21 of the oscillating suspension arm B and a second protruding portion 8 is arranged to protect a spherical joint 20 of a steering system C associated with the motor-vehicle (FIGS. 2 and 5).

Still with particular reference to FIGS. 2 and 5, the cover 1 integrated with the knuckle M has two upper attachment points 14 on its face intended to face towards the motor-vehicle in its mounted condition, designed for connection to a bracket S carrying a stem SI of the motor-vehicle shock absorber 19. The attachment points 14 have essentially parallel axes along a horizontal direction.

As previously mentioned, still with reference to the views of FIGS. 2 and 5, the cover 1 has a lower attachment point 13 designed for connection to the spherical joint 21 of the oscillating suspension arm B. The attachment point 21, similar to the attachment points 14, also has an axis oriented in an essentially horizontal direction.

Furthermore, with reference to the views of FIGS. 2 and 5, the cover 1 has a side attachment point 15 for the spherical joint 20 of the steering system C associated with the motor-vehicle, and a central attachment point 12 for connection to a tube T of the braking system of the motor-vehicle with which the cover 1 is associated.

Thanks to the above-mentioned characteristics, the above-described structure of the device according to the invention is particularly lightweight and, at the same time, sufficiently robust, as required for a motor-vehicle wheel knuckle.

In the following description of the present invention, the embodiment of device A' according to the present invention will now be described in detail, in which the cover 1' can be associated with a brake disc 2 of a rear non-drive wheel R of a motor vehicle.

As mentioned above, the brake disc cover according to the invention is integrated in a single piece with a support member associated with the wheel R, R' of the motor-vehicle.

In the embodiment illustrated in FIGS. 6-8, the cover 1' is integrated in a single piece with an element 16 rigidly carrying a wheel pin P' of the motor-vehicle wheel R'.

In this embodiment as well, the cover 1' can be produced in a single piece with the aforesaid element by means of the additive manufacturing productive technology.

In particular, with reference to the perspective views of FIGS. 7 and 8, the cover 1' has a structure comprising a plurality of lightening openings 11 and a plurality of structural reinforcement arms 18 arranged radially at the face of the cover 1' facing towards the motor-vehicle in its assembled condition (FIG. 8).

The cover 1' is similar to the one described above with a plurality of fins 4 and openings 5 arranged radially along a peripheral portion 6 of the cover 1', which allow effective cooling of the brake disc 2.

Furthermore, the element 16 comprises a plurality of threaded holes 17 for connection to a rear suspension arm 25 of the motor-vehicle, in close proximity to the wheel pin P'.

In a manner similar to that described for the device embodiment with a cover in a single piece with the knuckle M, the cover 1' comprises a pair of attachment points 9 designed for connection to the brake caliper 3.

Thanks to all of the characteristics described above, the device A, A' according to the invention comprising the cover 1, 1' formed in a single piece with the support member M, 16 produced with the additive manufacturing technique, allows a series of advantages to be obtained.

Firstly, the structure of the cover integrated in a single piece with the aforesaid supporting member allows reduction of the number of components typically used to produce the aforesaid device (typically a cover is rigidly connected by fixing means to a knuckle) and thus reduction of production costs.

Secondly, thanks to the production by means of the additive manufacturing technique, which allows components to be obtained with small dimensions, but with highly complex shapes, the cover also has a thermal function to cool the disc with which it is associated. This thermal function is obtained by means of the fins and openings described above.

Thirdly, thanks to the structure described above, the structure of the device is lightweight and sufficiently robust, as needed for a motor-vehicle suspension member.

The present invention is also directed at a motor-vehicle comprising at least two devices according to the invention (e.g., a pair of devices for non-drive wheels and/or a pair of devices for drive wheels).

Of course, without prejudice to the principle of the invention, the details of construction and the embodiments may vary widely with respect to those described and illustrated purely by way of example, without departing from the scope of the present invention.

What is claimed is:

1. A suspension device of a motor-vehicle wheel, including:
    a wheel support member, connected to a structure of a motor-vehicle by one or more suspension members,
    a brake disc connected in rotation with the wheel, and
    a brake disc cover rigidly connected to said wheel support member and surrounding, at least partially, said brake disc,
    wherein said brake disc cover is formed in a single piece with said wheel support member,
    wherein said wheel is a drive wheel and said wheel support member with which the brake disc cover is formed in a single piece, is a wheel knuckle, which rotatably supports a wheel pin, and
    wherein said brake disc cover comprises attachment points for connecting a brake caliper associated with said brake disc of said motor-vehicle wheel.

2. The device according to claim 1, wherein said brake disc cover is formed by an additive manufacturing technology.

3. The device according to claim 1, wherein said wheel is a non-drive wheel and said wheel support member with which the brake disc cover is formed in a single piece, is an element rigidly carrying the wheel pin.

4. The device according to claim 3, wherein said brake disc cover comprises a plurality of structural reinforcement arms arranged radially at a face of said cover facing towards an inside of said motor-vehicle in its mounted condition.

5. The device according to claim 3, wherein said brake disc cover comprises a plurality of threaded holes in proximity to said wheel pin for connecting said element to a rear suspension arm of said motor-vehicle.

6. The device according to claim 1, wherein said brake disc cover comprises a peripheral portion surrounding the brake disc and having a plurality of fins and openings arranged radially along said peripheral portion, said openings being designed to dissipate heat generated by said brake disc, said plurality of fins being configured in such a way as to convey a flow of cooling air within said openings.

7. The device according to claim 6, wherein said openings and said plurality of fins are arranged alternately to each other, so as to efficiently dissipate the heat generated by said brake disc during braking steps of said motor-vehicle.

8. The device according to claim 1, wherein said brake disc cover has a structure comprising a plurality of structural reinforcement arms, a plurality of lightening openings and a perforated central portion designed to receive therein an end of a motor-vehicle axle shaft.

9. The device according to claim 1, wherein said brake disc cover has a central attachment point on its face intended to face towards an inside of the motor-vehicle in its assembled condition, provided for supporting a tube of the braking system of the motor-vehicle.

10. The brake disc cover according to claim 1, wherein said brake disc cover includes an element rigidly carrying the wheel pin.

11. The brake disc cover according to claim 10, wherein said brake disc cover is formed by an additive manufacturing technology.

12. The motor-vehicle having at least one pair of suspension devices according to claim 1.

13. The device according to claim 1, wherein:
    said wheel is a non-drive wheel, and
    said brake disc cover comprises a peripheral portion surrounding the brake disc and having a plurality of fins and openings arranged radially along said peripheral portion, said openings being designed to dissipate heat generated by said brake disc, said plurality of fins being configured in such a way as to convey a flow of cooling air within said openings.

14. A suspension device of a motor-vehicle wheel, including:
    a wheel support member, connected to a structure of a motor-vehicle by one or more suspension members,
    a brake disc connected in rotation with the wheel, and
    a brake disc cover rigidly connected to said wheel support member and surrounding, at least partially, said brake disc,
    wherein said brake disc cover is formed in a single piece with said wheel support member,
    wherein said wheel is a drive wheel and that said wheel support member with which the brake disc cover is formed in a single piece, is a wheel knuckle, which rotatably supports a wheel pin, and
    wherein said brake disc cover comprises a first and a second peripheral covering portion, said first peripheral covering portion being arranged so as to cover a spherical joint of an oscillating arm of said suspension device and said second peripheral covering portion being arranged so as to cover a spherical joint of a steering system associated with said suspension device.

15. The device according to claim 14, wherein said brake disc cover has a lower attachment point on its face intended to face towards an inside of the motor-vehicle in its assembled condition, provided for connection to said spherical joint of said oscillating arm, said lower attachment point having a main axis extending in an essentially horizontal direction.

16. The device according to claim 14, wherein said brake disc cover has a side attachment point on its face intended to face towards an inside of the motor-vehicle in its assembled condition, provided for connection to said spherical joint of said steering system of said motor-vehicle.

17. A suspension device of a motor-vehicle wheel, including:
    a wheel support member, connected to a structure of a motor-vehicle by one or more suspension members,
    a brake disc connected in rotation with the wheel, and
    a brake disc cover rigidly connected to said wheel support member and surrounding, at least partially, said brake disc,
    wherein said brake disc cover is formed in a single piece with said wheel support member,
    wherein said wheel is a drive wheel and that said wheel support member with which the brake disc cover is formed in a single piece, is a wheel knuckle, which rotatably supports a wheel pin, and
    wherein said brake disc cover comprises two upper attachment points on its face intended to face towards an inside of the motor-vehicle in its assembled condition, provided for connection to a bracket carrying a stem of a shock absorber of said motor-vehicle, said upper attachment points having main axes directed along an essentially horizontal direction and being essentially parallel to each other.

* * * * *